United States Patent [19]
Shimada et al.

[11] Patent Number: 5,584,008
[45] Date of Patent: Dec. 10, 1996

[54] EXTERNAL STORAGE UNIT COMPRISING ACTIVE AND INACTIVE STORAGE WHEREIN DATA IS STORED IN AN ACTIVE STORAGE IF IN USE AND ARCHIVED TO AN INACTIVE STORAGE WHEN NOT ACCESSED IN PREDETERMINED TIME BY THE HOST PROCESSOR

[75] Inventors: Akinobu Shimada, Minami-ashigara; Masafumi Nozawa; Toshio Nakano, both of Odawara, all of Japan

[73] Assignee: Hitachi, Ltd., Tokyo, Japan

[21] Appl. No.: 943,580

[22] Filed: Sep. 11, 1992

[30] Foreign Application Priority Data

Sep. 12, 1991 [JP] Japan .................. 3-233191

[51] Int. Cl.⁶ .................. G06F 12/00; G06F 13/00
[52] U.S. Cl. .................. 395/441; 395/488; 395/439; 364/245.3; 364/243.2; 364/964.3; 364/DIG. 1
[58] Field of Search .................. 364/245.3, 243.2, 364/964.3; 395/439, 441, 488

[56] References Cited

U.S. PATENT DOCUMENTS

| | | | |
|---|---|---|---|
| 4,703,422 | 10/1987 | Kinoshita et al. | 395/425 |
| 5,128,810 | 7/1992 | Halford | 360/39 |
| 5,155,835 | 10/1992 | Belsan | 395/425 |
| 5,193,171 | 3/1993 | Shinmura et al. | 395/425 |
| 5,233,618 | 8/1993 | Guder et al. | 371/68.1 |
| 5,247,638 | 9/1993 | O'Brien et al. | 395/425 |
| 5,265,098 | 11/1993 | Mattson et al. | 371/11.1 |
| 5,283,791 | 2/1994 | Halford | 371/40.4 |
| 5,301,297 | 4/1994 | Menon et al. | 395/425 |
| 5,333,143 | 7/1994 | Blaum et al. | 371/40.4 |

OTHER PUBLICATIONS

IBM General Information GH 35-0092-5, 1989, "Data Facility Hierarchical Storage Manager" Version 2 Release 5.0.

Primary Examiner—Frank J. Asta
Attorney, Agent, or Firm—Fay, Sharpe, Beall, Fagan, Minnich & McKee

[57] ABSTRACT

An external storage system connected to a host apparatus includes a plurality of storage devices, and a control unit for controlling the above described plurality of storage devices, wherein the above described control unit manages a storage space formed by the above described plurality of storage devices by dividing the storage space into a first storage pool to be directly accessed by the above described host apparatus and a second storage pool not to be directly accessed by the above described host apparatus.

22 Claims, 7 Drawing Sheets

FIG. 3

30 LOGICAL VOLUME MANAGEMENT TABLE

| LOGICAL VOLUME | ACTIVE/ NONACTIVE (32) | TIME (33) | IN USE (34) | IN ARCHIVING (35) |
|---|---|---|---|---|
| LD 0 | 1 | 12:30 | 1 | 0 |
| LD 2 | 0 | 15:00 | 0 | 0 |
| | | | | |
| | | | | |

FIG. 4

40 NONACTIVE STORAGE POOL MANAGEMENT TABLE

| SPACE NUMBER | PHYSICAL VOLUME | FIRST POSITION | LOGICAL VOLUME | LOGICAL VOLUME SERIAL NUMBER | IN USE |
|---|---|---|---|---|---|
| 0 | PD16  PD23 | | LD 2 | 1/3 | 0 |
| 1 | PD16  PD23 | | LD 2 | 2/3 | 0 |
| | | | | | |
| 24 | PD48  PD55 | | LD 2 | 3/3 | 0 |

FIG. 5

50 ACTIVE STORAGE POOL MANAGEMENT TABLE

| SPACE NUMBER | PHYSICAL VOLUME | FIRST POSITION | LOGICAL VOLUME | IN USE |
|---|---|---|---|---|
| 0 | PD0 ~ PD7 | | LD 0 | 0 |
| 1 | PD0 ~ PD7 | | LD 1 | 1 |
| | | | | |
| 7 | PD8 ~ PD15 | | LD 4 | 0 |

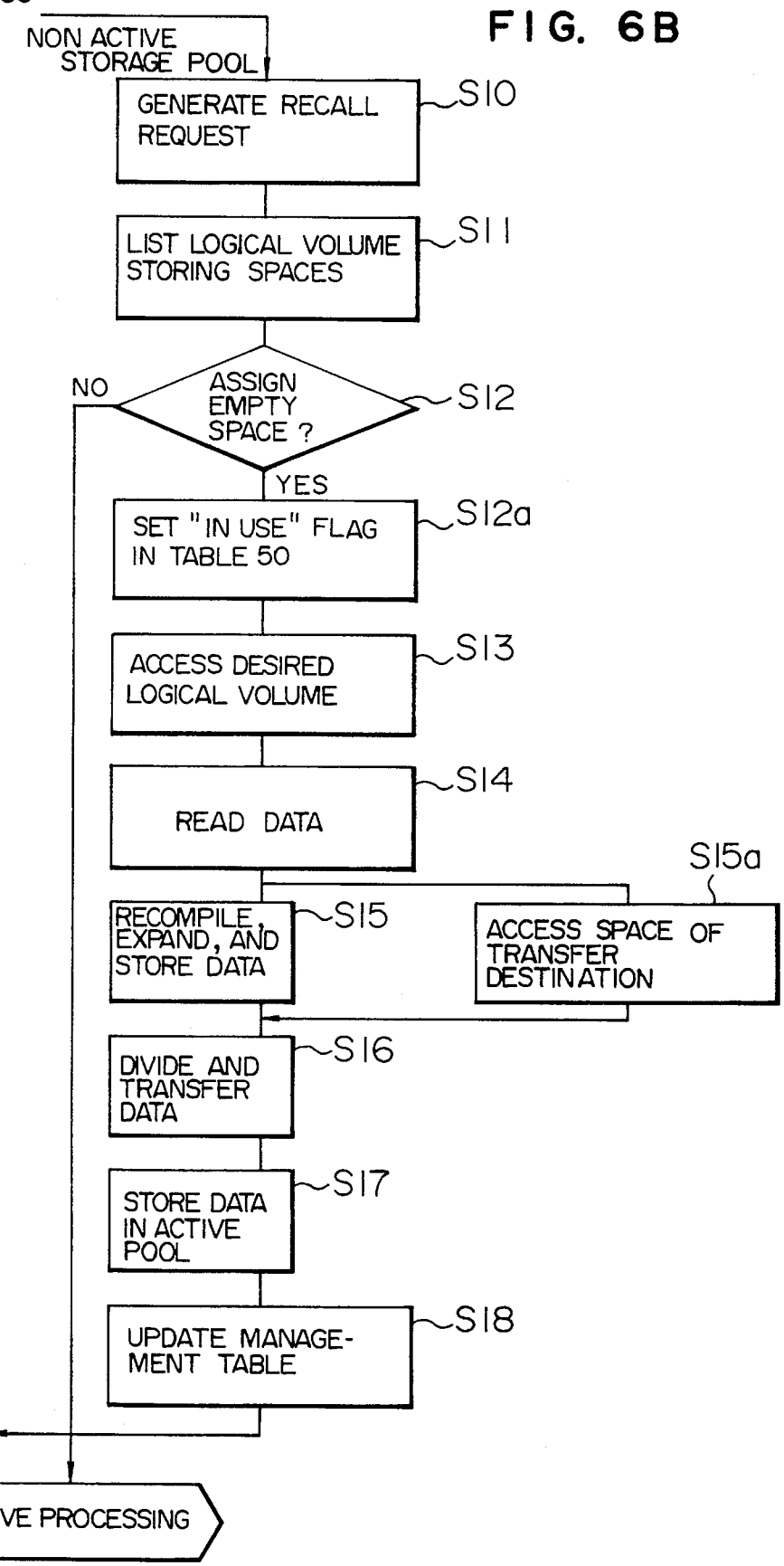

EXTERNAL STORAGE UNIT COMPRISING ACTIVE AND INACTIVE STORAGE WHEREIN DATA IS STORED IN AN ACTIVE STORAGE IF IN USE AND ARCHIVED TO AN INACTIVE STORAGE WHEN NOT ACCESSED IN PREDETERMINED TIME BY THE HOST PROCESSOR

BACKGROUND OF THE INVENTION

1. Field of the Invention

The present invention relates to an external storage system used in computer systems, and in particular to an external storage system which has a plurality of storage devices and a storage control device for controlling those storage devices and which is suitable for hierarchically managing storage space of a plurality of storage devices without intervention of a host apparatus (or initiator device) and thereby realizing a large capacity and a low bit cost without casting a burden upon the host apparatus.

2. Description of the Related Art

Conventionally, techniques for moving and storing respective data in suitable storage locations according to use frequency of respective data have widely been studied and developed as techniques of data management for making efficient use of limited storage space. For example, in JP-A-60-147855 and GH35-0092-5, "Data Facility Hierarchical Storage Manager Version 2 Release 5.0: General Information" published by IBM in 1989, automatic data management techniques in computer systems each having a plurality of external storage devices such as high-performance high-cost storage devices and low-performance low-cost storage devices connected to a host apparatus are described.

If the above described conventional techniques are used and there is no access of the host apparatus to data stored in a high-performance high-cost storage device for a predetermined time, this data is compressed by software stored in the host apparatus and thereafter transferred to a low-performance low-cost storage device and stored therein. Further, if there is access of the host apparatus to a low-performance low-cost storage device, this data is expanded and thereafter transferred to a high-performance high-cost storage device.

Every processing for data management as heretofore described is performed by "hierarchical storage management program" which is continuously executed in the host apparatus. Various external storage devices of a comparatively large-scale system are automatically managed, and optimization of use of the data storage space is aimed at.

SUMMARY OF THE INVENTION

In the above described conventional techniques, a comparatively large-scale system having a plurality of external storage devices differing in performance, capacity, cost and the like connected to the host apparatus is so configured that data may be transferred to an optimum external storage device according to the frequency of use and stored therein. All of control of storage hierarchy and data management of the entire system are executed by "hierarchical management program" stored in the host apparatus. Therefore, the host apparatus and an operating system controlling the host apparatus must participate in processing of data management in addition to normal processing. Accordingly, every data transfer between storage devices must go once by way of processing performed by the host apparatus, resulting in lowered throughput.

Further, in case the conventional techniques are applied to a small-sized computer system, the burden to the host apparatus becomes great and general processing may be affected thereby.

Further, the above described conventional techniques are originally techniques for hierarchically controlling a plurality of external storage devices connected to a host apparatus. In case only one external storage device capable of gaining direct access is connected to the host apparatus as in a small-sized computer system, therefore, it is impossible to hierarchically exercise data management on the inside of the external storage device. In thus making efficient use of limited storage space in a small-sized computer system and realizing a storage system having high performance, large capacity and low cost per bit (low bit cost), the above described conventional techniques have various problems.

Further, in the above described conventional techniques, data compression is performed when data are transferred from a high-performance external storage device to a low-performance external storage device, whereas data expansion is performed when data are transferred from a low-performance external storage device to a high-performance external storage device. Data compression is effective in efficient use of space of storage devices. In the above described conventional techniques, however, this data compression is performed by software stored in the host apparatus. Data compression by using software increases the overhead. Especially when there is a request to access data stored in a low-performance external storage device, it takes a lot of time to transfer data to a high-performance external storage device, resulting in worsened turn around time.

An object of the present invention is provide an external storage system capable of eliminating the above described drawbacks of the conventional techniques.

Another object of the present invention is to provide an external storage system having large capacity and low bit cost capable of hierarchically and automatically managing storage space within external storage devices.

Another object of the present invention is to provide an external storage system which makes it possible to hierarchically and automatically manage the storage space of external storage devices without participation of the host apparatus and the operating system and which can also be applied to a small-sized computer system including a host apparatus having low processing capability.

Still another object of the present invention is to provide an external storage system for exercising hierarchical management of storage space of external storage devices, in which overhead at the time of data transfer between hierarchical storage spaces is reduced, data compression and expansion are so performed as not to impose a burden on the host apparatus, and high performance, large capacity and low bit cost are reconciled.

Still another object of the present invention is to provide an external storage system of large capacity and low bit cost capable of hierarchically and automatically managing storage space within an external storage apparatus having such an array structure that data is divided into a plurality of parts, provided respectively with redundant data, and stored into a plurality of storage devices.

In accordance with one aspect of the present invention, an external storage system connected to a host apparatus includes a plurality of storage devices, and a control unit for controlling the above described plurality of storage devices, wherein the above described control unit manages a storage space formed by the above described plurality of storage devices by dividing the storage space into a first storage pool to be directly accessed by the above described host apparatus and a second storage pool not to be directly accessed by the above described host apparatus.

In accordance with another aspect of the present invention, an external storage system connected to a host apparatus includes a plurality of storage devices, and a control unit for controlling the above described plurality of storage devices, wherein the above described control unit includes a unit for managing a storage space formed by the above described plurality of storage devices by dividing the storage space into a first storage pool to be directly accessed by the above described host apparatus and a second storage pool not to be directly accessed by the above described host apparatus, a unit for dividing data transferred from the above described host apparatus into a plurality of parts, producing redundant data on the basis of all of divided data, and storing the above described divided data and the above described redundant data corresponding thereto distributionably in the storage devices of the above described first storage pool, and a data reconstruction unit, responsive to a data readout command issued by the above described host apparatus, for gaining parallel access to the divided data distributionably stored in the storage devices of the above described first storage pool to read them, reconstructing the original data, and transferring the reconstructed original data to the above described host apparatus.

In accordance with still another aspect of the present invention, an external storage system connected to a host apparatus includes a plurality of first storage devices, a second storage device having a lower cost per bit as compared with the above described plurality of first storage devices, the second storage device being not directly accessed by the above described host apparatus, and a control unit for controlling the above described plurality of first storage devices and second storage device, wherein the above described control unit includes a unit for managing a storage space formed by the above described plurality of storage devices by dividing the storage space into a first storage pool to be directly accessed by the above described host apparatus and a second storage pool not to be directly accessed by the above described host apparatus, and a unit for transferring data, which is included in data stored in the above described second storage pool and which has not been accessed by the host apparatus for at least a first predetermined time interval, from the second storage pool to the above described second storage device and for storing the transferred data therein.

In an example of the present invention, the above described control unit transfers data, which is included in data stored in the above described first storage pool and which has not been accessed by the host apparatus for at least a predetermined time interval, from the above described first storage pool to the above described second storage pool and for storing the transferred data therein.

Further, in case data accessed by the above described host apparatus is previously stored in the above described second storage pool, the above described control unit preferably transfers the above described data stored in the above described second storage pool to the above described first storage pool, stores the transferred data therein, and accesses the above described data stored in the above described first storage pool.

Further, in case data accessed by the above described host apparatus is previously stored in the above described second storage pool and there are no empty areas in the above described first storage pool, the above described control unit preferably transfers data, which is included in data stored in the above described first storage pool and which has been accessed earliest of all, to the above described second storage pool to form an empty area in the above described first storage pool, transfers the above described data stored in the above described second storage pool to the above described empty area of the above described first storage pool to store the data thus transferred therein, and accesses the above described data stored in the above described first storage pool.

Further preferably, the above described control unit reads out data, which is included in data stored in the above described first storage pool and which has not been accessed by the host apparatus for at least a predetermined time interval, compresses the data thus read out, transfers the data thus compressed to the above described second storage pool, and stores the transferred data therein.

Further, in case data accessed by the above described host apparatus is previously compressed and stored in the above described second storage pool, the above described control unit preferably expands the above described data stored in the above described second storage pool, thereafter transfers the data thus expanded to the above described first storage pool, stores the transferred data therein, and accesses the above described data stored in the above described first storage pool.

Further, in case the unit of access from the above described host apparatus is a logical volume, the above described control unit manages data stored in the above described first and second storage pools by taking the above described logical volume as the unit.

Further preferably, the above described control unit manages a storage space of the above described first storage pool by dividing the storage space into parts each having a predetermined capacity and manages a storage space of the above described second storage pool by dividing the storage space into parts each having a capacity smaller than the above described predetermined capacity.

Further preferably, a unit for exercising the above described management includes a first table having at least one information out of information indicating which of the above described first and second storage pools stores data transferred from the above described host apparatus, information indicating the last time when data stored in each of the above described first and second storage pools has been accessed by the above described host apparatus, and information indicating whether data stored in each of the above described first and second storage pools is being accessed by the above described host apparatus, a second table indicating contents of data stored in the above described first storage pool, and a third table indicating contents of data stored in the above described second storage pool.

In accordance with an example of the present invention, only data having high access frequency remain in the first storage pool (active storage pool) whereas data having low access frequency are stored in the second storage pool (nonactive storage pool).

The above described data management and data compression/expansion are performed within the control unit without intervention of the host apparatus. Therefore, the host apparatus need not be conscious of the first storage pool and the second storage pool at all. The host apparatus can thus gain access with interface similar to that of a general computer external storage device. Further, since there is no burden to the host apparatus, the present invention can also be applied to a small-sized computer system including a host apparatus having low processing capability.

As a result, it is possible to provide an external storage system and a control system for an external storage apparatus, in which data compression and expansion are performed so as not to impose a burden on the host apparatus, and high performance, large capacity, and low bit cost are reconciled.

BRIEF DESCRIPTION OF THE DRAWINGS

FIG. 3 is a diagram showing an example of a logical volume management table;

FIG. 4 is a diagram showing an example of a management table for nonactive storage pool;

FIG. 5 is a diagram showing an example of a management table for active storage pool;

FIGS. 6A and 6B are flow charts showing data read/write processing conducted in the embodiment of FIG. 1;

DESCRIPTION OF THE PREFERRED EMBODIMENTS

Embodiments of an external storage system according to the present invention will hereafter be described by referring to the accompanying drawings.

The present invention can be applied to an external storage apparatus for computer, such as a disk array apparatus, having an array structure in which data are divided into a plurality of parts, redundant data are added respectively to them, and resultant data are stored in a plurality of storage devices. Description will hereafter be given by taking a case where the present invention is applied to this disk array apparatus as an example. The storage apparatus having the array structure as described above accesses a plurality of storage devices in parallel. Therefore, data can be transferred at extremely high speed. As a result, higher speed of data transfer between storage pools (areas) can be expected. Further, if an abnormality should occur in data, data can be reconstructed from redundant data, resulting in a system having high reliability.

Figure 1:
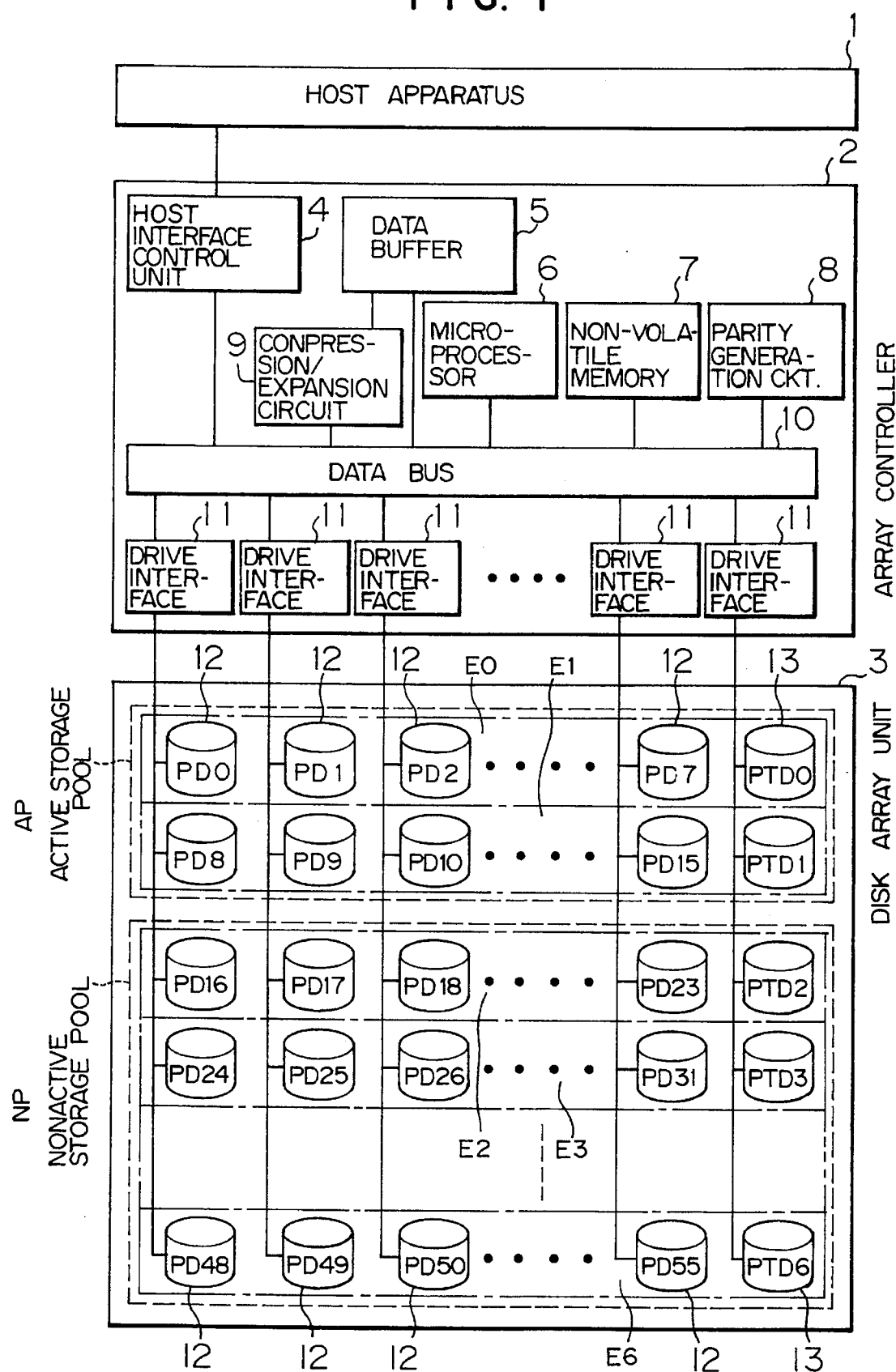
FIG. 1 is a block diagram showing an embodiment in which an external storage system according to the present invention has been applied to an array magnetic disk device.

FIG. 1 is a block diagram showing an embodiment in which an external storage system according to the present invention has been applied to a disk array apparatus such as an array magnetic disk apparatus. In FIG. 1, numeral 1 denotes a host apparatus, 2 an array controller which is a management unit, 3 a disk array unit including a plurality of, say 63, magnetic disk devices PD0–PD55 and PTD0–PTD6, 4 a high rank or host interface control unit for controlling data exchange with the host apparatus, 5 a memory such as a data buffer for temporarily storing data and attaining synchronization, 6 a microprocessor for controlling the entire array magnetic apparatus, 7 a memory such as a non-volatile memory for recording management information of logical volumes, 8 a parity generation circuit for adding redundant data to divided data, 9 a compression/expansion circuit for compressing and expanding data, 10 a data bus for dividing data transferred from the host apparatus and reorganizing data transferred from a plurality of magnetic disk devices 12 and 13, 11 a drive interface control unit for controlling data exchange with the magnetic disk devices 12 and 13, 12 a magnetic disk device, and 13 a parity magnetic disk for recording redundant data of divided data. Characters PD0–PD55 and PTD0–PTD6 attached to magnetic disk devices 12 and 13 indicate numbers of physical volumes which will be described later.

In the disk array unit of the embodiment shown in FIG. 1, a set of, say, eight magnetic disk devices 12 and, say, one magnetic disk device 13 in a first row form an error checking and correcting feature (ECC) group E0. In a second row, eight magnetic disk devices 12 and one magnetic disk device 13 form an ECC group E1. In the same way, ECC groups E2–E6 are formed. Each of the magnetic disk devices 12 and 13 has a storage capacity of, say, 500 megabytes (MB). Constitution of such an ECC group is arbitrary. The number of magnetic disks in the disk array unit 3 may be freely determined. Further, a single parity disk device (PTD) need not necessarily be provided in each ECC group, but two or more parity disk devices may be provided in each ECC group to further improve the reliability. Further, instead of providing dedicated parity disk devices (PTD), redundant data may be distributed among and stored in magnetic disk devices PD.

In the present embodiment, ECC groups E0 and E1, for example, included in the ECC groups E0–E6 in the disk array unit 3 are defined as active storage pools AP, whereas the remaining ECC groups E2–E6 are defined as nonactive storage pools NP, and both pools AP and NP are managed separately. The active storage pool AP and the nonactive storage pool NP can be defined freely, and a configuration different from that of the present embodiment may be adopted.

Herein, in the storage space formed by magnetic disk devices of the disk array unit 3, storage pools (areas) to be directly accessed by the host apparatus (or capable of being directly accessed by the host apparatus) are defined as active storage pools (areas), whereas storage pools (areas) which are not to be directly accessed by the host apparatus (or which cannot be directly accessed by the host apparatus) are defined as nonactive storage pools (areas).

Further, in the present embodiment, the high rank interface control unit 4 has only one bus path connecting the host apparatus to the array controller 2. However, the high rank interface control unit 4 may have a plurality of such bus paths.

Further, the high rank interface control unit 4 may be connected to a plurality of host apparatuses 1 so that the disk array unit 3 may be accessed by these host apparatuses.

The physical structure of the present embodiment has heretofore been described. The host apparatus 1 is not conscious of this physical structure. Some capacity part of one ECC group formed by nine physical volumes (magnetic disk devices) is regarded as one logical disk volume (hereafter referred to as logical volumes). In each of ECC groups E0–E6, data are divided and stored in eight remaining physical volumes excluding the parity disk devices PTD0–PTD6. The host apparatus 1 accesses data by taking the above described logical volume as the unit.

Figure 2:
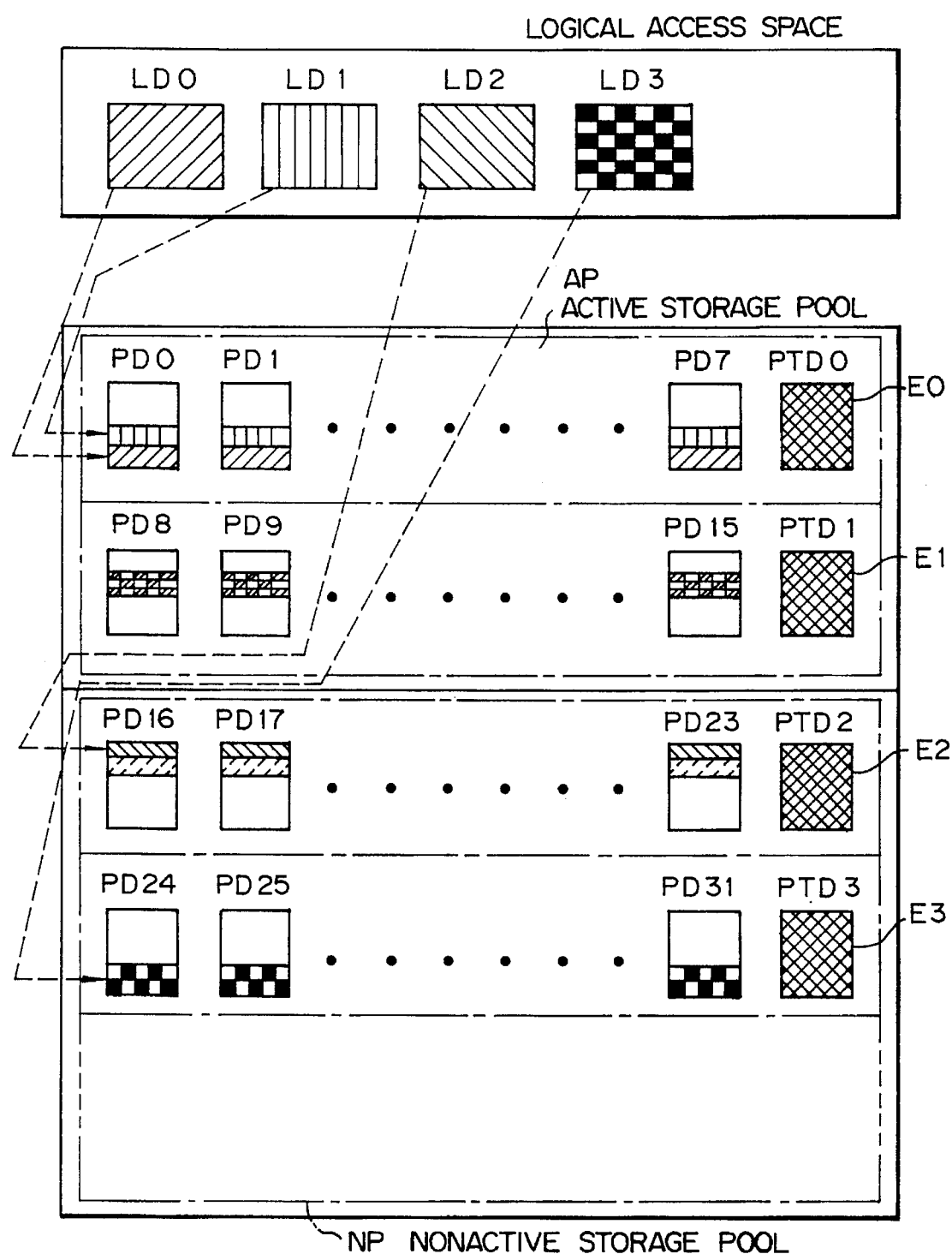
FIG. 2 is a schematic diagram showing an example of association of logical volumes with physical volumes in the embodiment of FIG. 1.

Association of logical volumes with physical volumes in the embodiment shown in FIG. 1 will now be described by referring to FIG. 2. In FIG. 2, LD0, LD1, LD2, LD3 . . . each denotes a logical volume, and PD0, PD1, PD2, PD3 . . . each denotes a physical volume. PTD0, PTD1, PTD2, PTD3 . . . each denotes a physical volume of parity disk. In this embodiment, one gigabyte (GB) is defined as one logical volume, whereas each of the physical volumes PD0, PD1, PD2, PD3 . . . is defined to have 500 MB, and each of the physical volumes PTD0, PTD1, PTD2, PTD3 . . . is defined to have 500 MB. Further, each logical volume LD0, LD1, LD2, LD3 . . . is defined to have a capacity of one GB. This capacity of one GB of each logical volume is divisionally assigned to eight physical volumes at the rate of 125 MB per physical volume.

As illustrated, data of the logical volume LD0 are divisionally stored in certain areas respectively of the physical volumes PD0–PD7 in the ECC group E0, for example. Data of the logical volume LD1 are divisionally stored in different areas respectively of the physical volumes PD0–PD7 in the same ECC group E0, for example. In this way, four physical volumes at most are stored in each of the ECC groups E0 and E1. As a result, eight logical volumes at most are stored in the active storage pool AP.

On the other hand, logical volumes, which are not accessed by the host apparatus 1 for at least a predetermined interval (such as one month), such as LD2 and LD3 are stored in the nonactive storage pool NP in the state of compressed data.

Assuming now that access to the logical volume LD3, for example, is requested by the host apparatus 1, the logical volume LD3 stored in the physical volumes PD24–PD31 in the nonactive storage pool NP are subjected to data expansion and thereafter stored in empty areas of the active storage pool AP, such as the physical volumes PD8–PD15. Thereby, access from the host apparatus 1 is made possible. In case the logical volume LD0 is not accessed by the host apparatus 1 for at least, say, one month, the logical volume LD0 stored in the physical volumes PD0–PD7 in the active storage pool AP can be stored in empty spaces of the physical volumes PD16–PD23, for example, after data compression.

Logical volumes can be freely set by the microprocessor 6. Therefore, association of logical volumes with physical volumes, which is different from that of the present example, can also be freely set.

In order to perform the above described association of logical volumes with physical volumes and management of the active storage pool AP and the nonactive storage pool NP, the array controller 2 preferably has a logical volume management table, an nonactive storage pool management table, and an active storage pool management table in the non-volatile memory 7.

FIG. 3 is a diagram showing an example of the logical volume management table. For each of logical volumes, the logical volume management table 30 is shown as having an active/nonactive information field 32 for indicating which of the active storage pool AP and nonactive storage pool NP stores that logical volume, a time field 33 for indicating the last time when that logical volume has been accessed (such as time when access has been completed), an information field 34 for indicating whether that logical volume is now being used or not, and an information field 35 for indicating whether that logical volume is now being in archive processing or not. Herein, archive processing refers to processing for transferring a logical volume, which has been stored in the active storage pool AP and which has not been accessed for at least a predetermined time (such as for at least one month), from the active storage pool AP to the nonactive storage pool NP. If the logical volume is being subjected to archive processing, "1" is preferably set in the information field 35. Unless the logical volume is being subjected to archive processing, "0" is preferably set in the information field 35.

If the logical volume is stored in the active storage pool, "1" is stored in the information field 32 If the logical volume is stored in the nonactive storage pool, "0" is stored in the information field 32.

In the same way, if the logical volume is now being used, "1" is preferably set in the information field 34. Unless the logical volume is being used, "0" is preferably set in the information field 34.

FIG. 4 is a diagram showing an example of the management table for nonactive storage pool. The nonactive storage pool management table is provided to manage the situation of use of storage spaces in the nonactive storage pool NP. As illustrated, the nonactive storage pool management table 40 manages the nonactive storage pool NP on the basis of the space number. In the nonactive storage pool NP, the storage capacity of each physical volume in the ECC group is divided by taking each capacity of 100 MB as one space and each of storage spaces resulting from division is provided with one space number. "First position" in the nonactive storage pool management table 40 means first address in the physical volume of each storage space, i.e., physical address (such as cylinder number, head number, or record number) of each storage space. In some cases, a logical volume stored in the nonactive storage pool NP is stored so as to extend over a plurality of storage spaces. In this case, each of parts of the logical volume thus divided is provided with a serial number, and this is recorded in the nonactive storage pool management table 40 as logical volume serial number.

For instance, in the illustrated example, logical volume LD2 is distributed to and stored in storage spaces respectively having space numbers 0, 1 and 24.

FIG. 5 is a diagram showing an example of the management table for active storage pool. The active storage pool management table is provided to manage the situation of use of storage spaces in the active storage pool AP. As illustrated, the active storage pool management table 50 manages the active storage pool AP on the basis of the space number. In the active storage pool AP, the capacity of preferably one GB storing one logical volume entirely is defined as one storage space. In each ECC group, therefore, four storage spaces are present. Further, "head position" in the active storage pool management table 50 means head address (physical address) in the physical volume of each storage space.

As occasion demands, the microprocessor 6 performs search, setting and resetting for these management tables and controls the storage system.

Figure 6A:
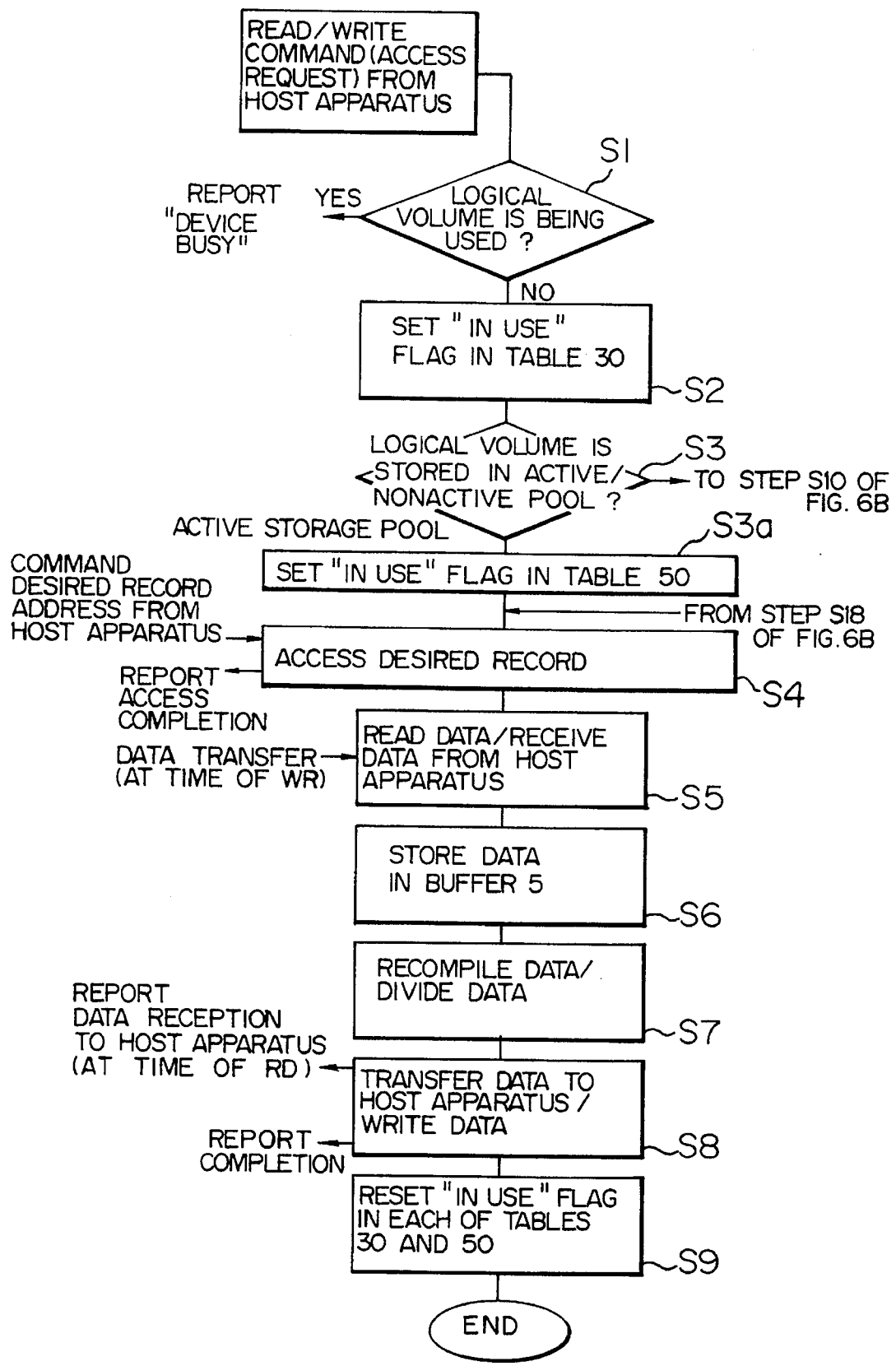

Flow of concrete control accompanying the read operation/write operation will now be described by referring to the flow chart shown in FIGS. 6A and 6B.

Upon receiving an access request accompanying a read/write command from the host apparatus 1 via the high rank interface control unit 4 and the data bus 10, the microprocessor 6 determines whether the logical volume, for which the access request is made, is now being used by referring to the logical volume management table 30 recorded in the non-volatile memory 7 (step S1). If it is determined that the logical volume is being used, an answer of "device busy" is returned to the host apparatus. If it is determined that the logical volume is not being used, a flag indicating that the logical volume is being used, preferably "1" is set in the "in use" field of the logical volume management table 30 to state explicitly that the logical volume is being monopolized (step S2). Then the microprocessor 6 determines whether the logical volume is stored in the active storage pool AP or stored in the nonactive storage pool NP by referring to the above described logical volume management table 30 (step S3).

(a) The case where it is determined that the logical volume to be accessed is present in the active storage pool AP will now be described.

In this case, the following processing is performed. That is to say, the microprocessor 6 sets flag "1" in the "in use" flag corresponding to the storage space in which that logical volume in the management table 50 for active storage pool is stored in order to indicate that the logical volume is now being used (step S3a). Further, the microprocessor 6 confirms the physical volumes and head addresses (positions) storing that logical volume by referring to the active storage pool management table 50. The microprocessor 6 commands the drive interface control unit 11 to access (position) desired record addresses of respective physical volumes, i.e., seek addresses.

Upon receiving a seek address command from the host apparatus, the drive interface control unit 11 performs access processing. After completion of the access, the microprocessor 6 reports completion of the access to the host apparatus 1 (step S4).

If a read command is issued by the host apparatus 1 in response to the above described access completion report, the microprocessor 6 commands the drive interface control unit 11 to read out data from respective physical volumes. The drive interface control unit 11 reads out data (step S5) and stores the data in the data buffer 5 via the data bus 10 (step S6). While data are being recompiled (step S7), data are transferred from the high rank interface control unit 4 to the host apparatus 1 (step S8). After data transfer has been finished, the microprocessor 6 reports the completion to the host apparatus 1 (step S8). Further, the microprocessor 6 sets transfer completion time in the time field 33 of the logical volume management table 30. The microprocessor 6 further resets the flag, which has been set in the "in use" field 34 for that logical volume in each of the management table 30 and which indicates that the logical volume is in use. Further, the microprocessor 6 resets the flag which has been set in the "in use" field for the storage space in which that logical volume is stored. (Preferably, the microprocessor 6 makes the flags "0".) That logical volume is thus released (step S9).

In case a fault occurs in a part of a plurality of physical volumes for which the read command has been issued and the fact that data cannot be read is detected by the drive interface unit 11, the microprocessor 6 causes readable data other than that part of data and redundant data in the parity disk device corresponding thereto to be read out in the drive interface control unit 11, transmits the data thus read out to the parity generation circuit 8, and causes correct data to be reproduced in the parity generation circuit 8.

Even in case data are transferred from the nonactive storage pool to the active storage pool or vice versa, correct data can be reproduced from faulty data in the same way.

In case a write command is issued by the host apparatus 1, the high rank interface control unit 4 receives data transferred from the host apparatus 1 (step S5) and transfers the data thus received to the data buffer 5 to store the data therein (step S6). The microprocessor 6 divides data transferred to the data buffer 5 and develops the divided or striped data on the data bus 10. The parity generation circuit 8 generates redundant data on the basis of or corresponding to all the divided data (step S7). Then the microprocessor 6 commands the interface control unit 11 to write data. Thereby data writing is initiated (step S7). When data writing is finished, the microprocessor 6 reports completion of writing operation to the host apparatus 1 (step S8). The microprocessor 6 sets the time at this time in the time field 33 of the logical volume management table 30. At the same time, the microprocessor 6 resets the flag, which has been set in the "in use" field 34 in each of the management tables 30 and 50 corresponding to that logical volume and which indicates that the logical volume is being used. (Preferably, the microprocessor 6 makes the flag "0".) The microprocessor 6 thus releases the logical volume (step S9).

(b) The case where the logical-volume to be accessed is present in the nonactive storage pool NP will now be described.

In this case, the following processing is performed. That is to say, the microprocessor 6 generates a recall request for transferring that logical volume existing in the nonactive storage pool NP to the active storage pool AP (step S10). In order to know in which storage space in the nonactive storage pool NP and in what order that logical volume is stored, the microprocessor 6 then lists space Nos. by referring to the nonactive storage pool management table 40 (step S11). By referring to the active storage pool management table 50, the microprocessor 6 determines whether there are storage spaces whereto logical volumes are not now assigned (empty spaces) in physical volumes within the active storage pool AP. If there are empty spaces, the microprocessor 6 selects destination of transfer of that logical volume out of those empty spaces (step S12). If destination of transfer is determined, the microprocessor 6 sets the flag indicating "in use" in the "in use" flag field corresponding to the storage space of transfer destination in the active storage pool management table 50 (step S12a).

Unless there are empty spaces in physical volumes within the active storage pool AP, the microprocessor 6 commands one of volumes stored in the active storage pool AP, for which the longest time has elapsed since the last access, to be transferred to the nonactive storage pool. This processing is similar to data transfer performed for the logical volume in the active storage pool which has not been accessed for one month. Such processing is called archive processing. Details of this archive processing will be described later.

Then the microprocessor 6 commands the drive interface control unit 11 to access storage spaces of a plurality of physical volumes in which that logical volume to be accessed is stored (step S13). After completion of the access, the microprocessor 6 reads out data from the plurality of physical volumes (step S14), transfers the data thus read out to the compression/expansion circuit 9 via the data bus 10 while recompiling the data thus read out into one data, expands all of the recompiled data of that logical volume, and stores the expanded data in the data buffer 5 (step S15). In parallel with this operation, the microprocessor 6 commands the drive interface control unit 11 to access the storage space assigned in the active storage pool AP as the transfer destination of that logical volume (step S15a). After completion of access, the microprocessor 6 divides or stripes the data stored in the data buffer 5 into eight data and transfers them to the data bus 10. According to a command of the microprocessor 6, the drive interface control unit 11 transfers each of data resulting from division to an assigned physical volume. At the same time, the microprocessor 6 causes the parity generation circuit 8 to generate redundant data and transfers the redundant data to parity physical volumes (step S16). Thereby data are stored in that logical volume (step S17). After Completion of all data, the microprocessor 6 updates information relating to that logical volume in respective management tables. That is to say, the microprocessor 6 changes the active/ nonactive field 32 of the logical volume management table 30 to active storage pool, writes the logical volume number assigned to the storage space of the active storage pool management table 50, sets the flag indicating that the storage space is being used, resets the assigned logical volume number and its serial numbers in the nonactive storage pool management table 40, and resets the flag indicating that the storage space is being used (step S18).

Thereby, that logical volume for which the access request is made has been stored in physical volumes within the active storage pool AP. Therefore, processing similar to the above described processing of (a) is then performed, and data read or write operation is executed (steps S4–S9). Here, the above described processing of (b) is lost to sight of the host apparatus. It looks like the above described processing of (a) with access taking a lot of time. The above described serial processing of (b) (steps S11–S18) is called recall processing.

Figure 7:
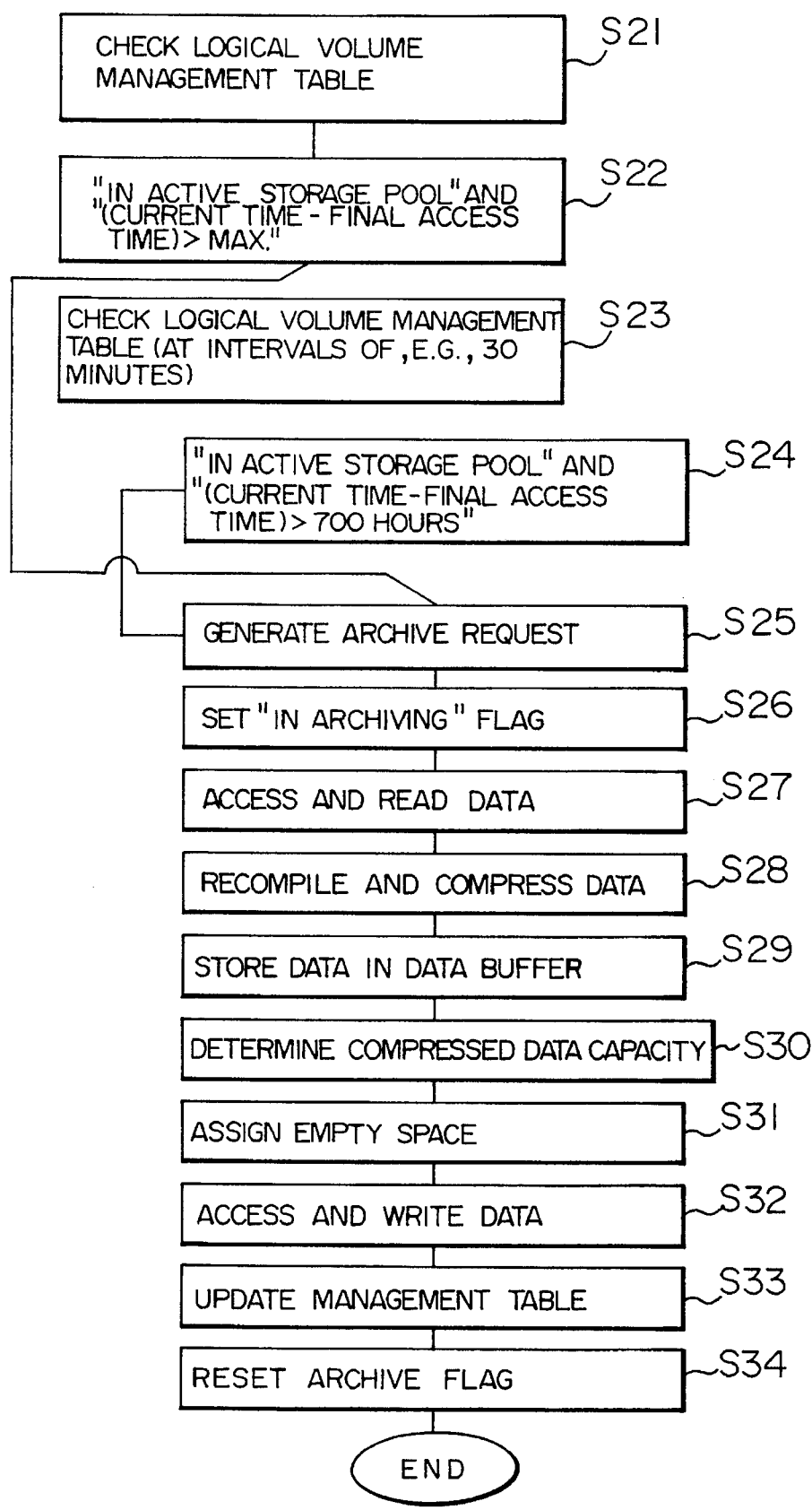
FIG. 7 is a flow chart showing processing for transferring data from an active storage pool to an nonactive storage pool in the embodiment of FIG. 1.

In case a logical volume stored in the active storage pool AP is not accessed by the host apparatus 1 for a predetermined interval (one month in the present example), archive processing is performed. Also in case an access request is made for a logical volume stored in the nonactive storage pool NP, but a storage space for transferring and storing that logical volume is not present in the active storage pool AP (i.e., in case the result of decision at step S12 in FIG. 6B is "no"), archive processing is performed. The archive processing (processing for moving logical volume from the active storage pool to the nonactive storage pool) will now be described by referring to the flow chart shown in FIG. 7.

That is to say, in case an access request is made for a logical volume stored in the nonactive storage pool, but a storage space for transferring and storing that logical volume is not present in the active storage pool (i.e., in case it is determined that an empty storage space is not present in the active storage pool in the course of recall processing), the microprocessor 6 checks the "time" field by referring to the logical volume management table 30 (step S21), derives "current time—final access time" for respective logical volumes of the active storage pool, and searches for a logical volume for which the above described value is maximized (step S22).

Regardless of the access request made by the host apparatus 1, the microprocessor 6 checks the "time" field by referring to the logical volume management table 30 at intervals of fixed time (such as 30 minutes in the present example) (step S23), and searches for a logical volume in the active storage pool for which the "current time—final access time" has exceeded, say, 700 hours (step S24).

In the wake of step S22, or in case a logical volume in the active storage pool for which the "current time—final access time" has exceeded 700 hours is found at step S24, the microprocessor 6 generates an archive request for transferring that logical volume to the nonactive storage pool NP (step S25), and sets a flag indicating that archive processing is being executed in the "in archiving" field in the logical volume management table 30 corresponding to the storage space in which that logical volume is stored. At the same time, the microprocessor 6 sets a flag indicating "in use" in the field of "in use" flag in the active storage pool management table corresponding to that logical volume (step S26). In case a logical volume for which a flag indicating that archive processing is being executed has been set is accessed by the host apparatus 1, the microprocessor 6 immediately discontinues the archive processing and resets the above described flag indicating "in archive processing".

By referring to the active storage pool management table 50, the microprocessor 6 then confirms a plurality of physical volumes and storage space numbers storing that logical volume. The microprocessor 6 commands the interface control unit 11 to access storage spaces of the above described confirmed physical volumes. After completion of access, the interface control unit 11 reads out data from the storage spaces (step S27). The interface control unit 11 transfers data thus read out to the data buffer 5 via the data bus 10. According to a command from the microprocessor 6, divided data are then recompiled and transferred to the compression/expansion circuit 9 (step S28). Data thus compressed are temporarily stored in the data buffer 5 (step S29). At this time, the microprocessor 6 measures the capacity Vc of all data of that logical volume after data compression (step S30). By referring to the nonactive storage pool management table 40, the microprocessor 6 then searches N (where N is an integer of at least 1) storage space numbers of a plurality of physical volumes to which logical volumes are not now assigned until the condition "100 MB×N≧Vc" is satisfied. The microprocessor 6 assigns physical volumes corresponding to these N storage space numbers to destinations of transfer of that logical volume. With regard to each of the assigned storage spaces, the microprocessor 6 sets the "in use" flag in the "in use" field in the nonactive storage pool management table 40 (step S31). Then the microprocessor 6 commands the drive interface control unit 11 to access the storage spaces of the assigned physical volumes. Further, after completion of access, the drive interface control unit 11 divides data stored in the data buffer 5 into a plurality of parts, transfer them to the proper physical volumes via the data bus 10, and writes the data (step S32). After all data have been written, the microprocessor 6 changes contents of the corresponding "active/nonactive" field 32 in the logical volume management table 30 to "nonactive" (change of the storage pool) and resets the flag in the corresponding "in archiving" field 35. Further, the microprocessor 6 sets the logical volume field and logical volume serial numbers in the nonactive storage pool management table 40 corresponding to that transferred logical volume, and resets the "in use" flag (steps S33 and S34).

In case an access request is made by the host apparatus 1 to a logical volume stored in a physical volume which is the destination of data transfer in the course of archive processing, the microprocessor 6 immediately discontinues the archive processing, releases that physical volume, and executes recall processing with priority.

The reason why the capacity of storage space in the active storage pool is made different from that in the nonactive storage pool in the above described embodiment will now be described. That is to say, data are compressed when the data are to be stored in the nonactive storage pool. Accordingly, the capacity of data after compression cannot be estimated. Therefore, the capacity of the storage space of the nonactive storage pool is managed so as to be made smaller than that of the active storage pool and required number of the storage spaces are used depending on the capacity of the compressed data. Thus, the storage spaces can be utilized effectively despite of the change of the data capacity due to the data compression.

The above described embodiment has been described by taking an array magnetic disk device as an example. However, the present invention is not limited to this. The present invention can also be applied to a computer external storage apparatus formed by a plurality of magnetic disk devices which does not have an array structure, such as the external storage apparatus as shown in FIG. 8.

Figure 8:
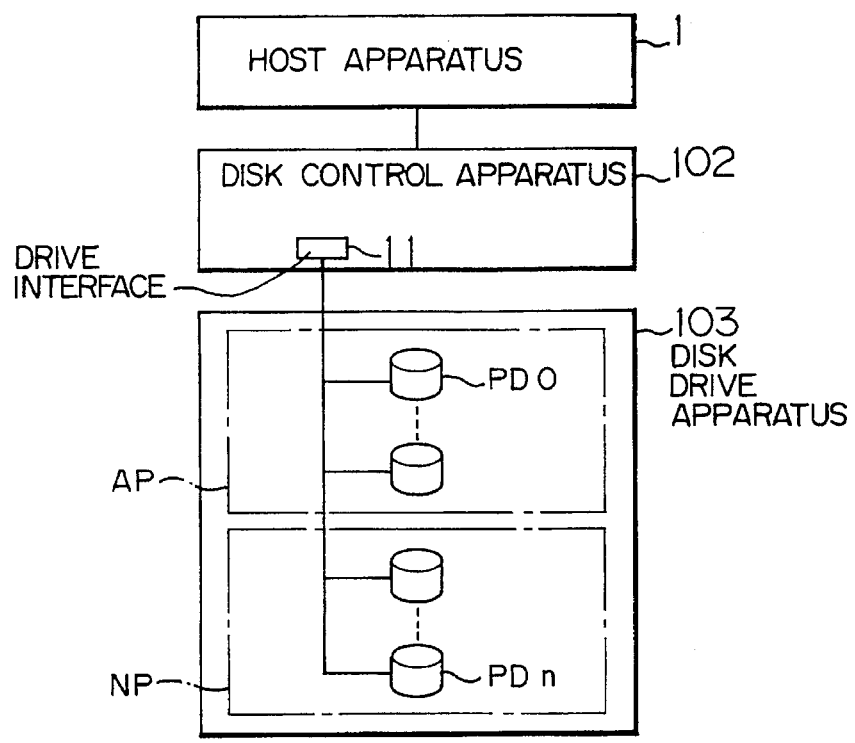
FIG. 8 is a diagram showing another embodiment in which an external storage system according to the present invention is applied to a magnetic disk apparatus.

In FIG. 8, a disk control apparatus 102 is identical with the array controller 2 of FIG. 1 excepting that it has only one drive interface unit 11.

As compared with the magnetic disks of the disk array unit 3 of FIG. 1, a disk drive apparatus 103 has only one column included in a plurality of columns of magnetic disk devices 12.

Further, the present invention can also be applied to a computer external storage apparatus using devices other than magnetic disks (such as optical disks) as storage media.

In addition, it is also possible to add low bit cost storage devices such as optical disk library devices or magnetic tape library devices to the configuration of the embodiment shown in FIG. 1. In case an access request is not made by the host apparatus 1 to a logical volume stored in the nonactive storage pool for a further long interval (such as six months), that logical volume is transferred from the nonactive storage pool NP to these low bit cost storage devices via the array controller 2. Thereby, both the active storage pool and nonactive storage pool can be used more efficiently.

Figure 9:
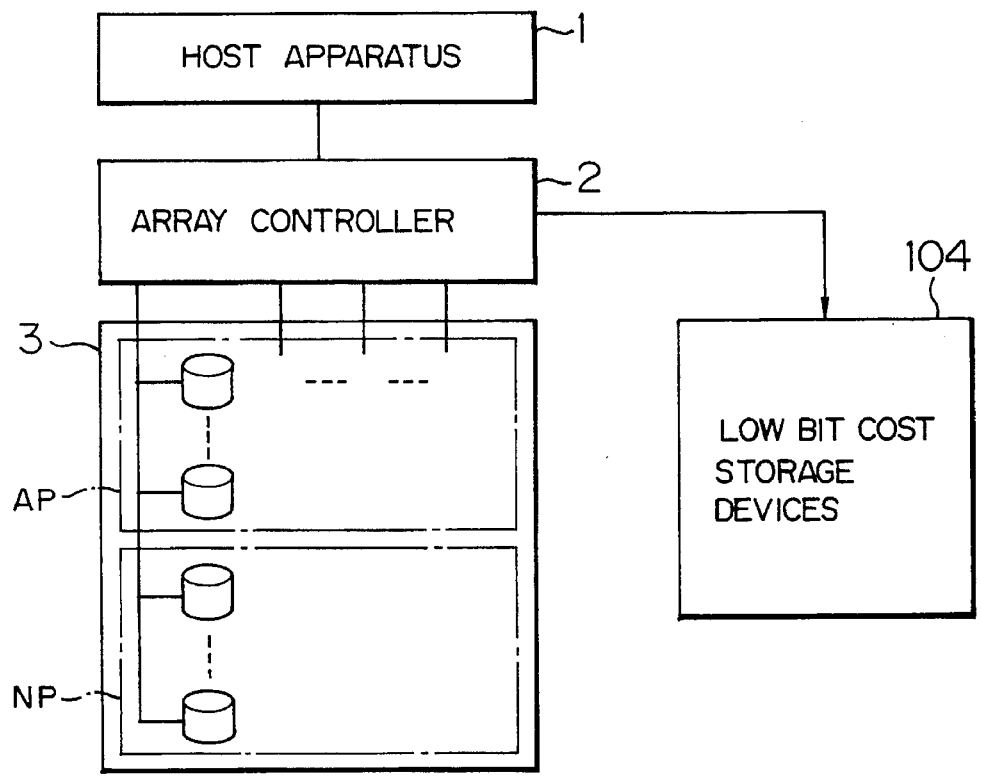
FIG. 9 is a block diagram showing an embodiment in which an external storage system according to the present invention is applied to an external storage apparatus including a low bit cost storage device.

FIG. 9 is a diagram showing such an embodiment. Transfer of data from the nonactive storage pool to the low bit cost storage devices 104 is performed in the same way as the above described transfer of data from the active storage pool to the nonactive storage, pool.

In this embodiment, information indicating whether data are stored in the low bit cost devices or not may be set in a field of the management table 30, and a low bit cost storage device management table may be provided.

Readout of data from the low bit cost devices can be done in the same way as readout of data from the nonactive storage pool.

Referring to the above described first embodiment, the total storage capacity is at most 28 GB when the present invention is not applied. Supposing that the present invention is applied and the compression factor of data stored in the nonactive storage pool is 80%, the total storage capacity becomes 108 GB at most. The present invention brings about an effect that a storage capacity close to four times is obtained with nearly the same performance and cost.

According to the present invention, storage spaces of a computer external storage apparatus formed by a plurality of storage devices is managed by dividing them into an active storage pool and a nonactive storage pool as heretofore described. Control is exercised so that logical volumes frequently accessed may be stored in the above described active storage pool, whereas logical volumes which are not accessed for a long time may be subjected to data compression and stored in the above described nonactive storage pool. As a result, limited storage devices can be used efficiently, and it is possible to realize a computer external storage subsystem which looks like a subsystem having high performance and an extremely large capacity when viewed from the host apparatus.

That is to say, it is possible to provide an external storage apparatus having a large capacity and a low bit cost by hierarchically and automatically managing the storage spaces within the external storage apparatus.

It is made possible to hierarchically and automatically managing the storage spaces of the external storage apparatus without the intervention of the host apparatus and operating system. It is possible to provide an external storage apparatus which can also be applied to a small-sized computer system including a host apparatus having low processing capability.

Further, it is possible to provide an external storage apparatus for exercising hierarchical management of storage spaces of external storage devices, in which overhead at the time of data transfer between hierarchical storage spaces is reduced, data compression and expansion are so performed as not to impose a burden on the host apparatus, and high performance, large capacity and low bit cost are reconciled.

We claim:

1. An external storage unit connected to a host apparatus, comprising:

a plurality of storage devices; and means for controlling said plurality of storage devices, wherein said control means comprises means for managing a storage space formed by said plurality of storage devices by dividing said storage space into a first storage pool to be directly accessed by said host apparatus and a second storage pool not to be directly accessed by said host apparatus; and means for transferring data between said first and second storage pools independently of said host apparatus.

2. An external storage unit according to claim 1, wherein said control means comprises means for transferring data, which is included in data stored in said first storage pool and which has not been accessed by the host apparatus for at least a predetermined time interval, from said first storage pool to said second storage pool and for storing the transferred data in said second storage pool.

3. An external storage unit according to claim 1, wherein said control means comprises means for reading out data, which is included in data stored in said first storage pool and which has not been accessed by the host apparatus for at least a predetermined time interval, and compressing the data thus read out, and means for transferring the compressed data to said second storage pool and storing the transferred data in said second storage pool.

4. An external storage unit according to claim 1, wherein said control means comprises means responsive to fact that data accessed by said host apparatus is previously stored in said second storage pool, for transferring said data stored in said second storage pool to said first storage pool and storing the transferred data in said first storage pool, and means for accessing said data stored in said first storage pool.

5. An external storage unit according to claim 1, wherein said control means comprises:

means responsive to fact that data accessed by said host apparatus is previously stored in said second storage pool and there are no empty areas in said first storage pool, for transferring data, which is included in data stored in said first storage pool and which has been accessed earliest of all, to said second storage pool to form an empty area in said first storage pool;

means for transferring said data stored in said second storage pool to said empty area of said first storage pool and storing said transferred data in said empty area; and means for accessing said data stored in said first storage pool.

6. An external storage unit according to claim 3, wherein said control means comprises:

means for expanding said compressed data stored in said second storage pool, means for transferring said expanded data to said first storage pool and storing said expanded data in said first storage pool; and means for accessing said expanded data stored in said first storage pool.

7. An external storage unit according to claim 1, wherein said control means comprises means responsive to fact that the unit of access from said host apparatus is a logical volume, for managing data stored in said first and second storage pools by taking said logical volume as the unit.

8. An external storage unit according to claim 6, wherein said control means comprises means for managing a storage space of said first storage pool by dividing the storage space into parts each having a predetermined capacity and managing a storage space of said second storage pool by dividing the storage space into parts each having a capacity smaller than said predetermined capacity.

9. An external storage unit connected to a host apparatus, comprising:

a plurality of storage devices; and means for controlling said plurality of storage devices, wherein said control means comprises:

means for managing a storage space formed by said plurality of storage devices by dividing the storage space into a first storage pool to be directly accessed by said host apparatus and a second storage pool not to be directly accessed by said host apparatus;

means for dividing data transferred from said host apparatus into a plurality of parts, producing redundant data on the basis of all of said divided data, and storing said divided data and said redundant data corresponding thereto distributionally in said storage devices of said first storage pool;

data reconstruction means, responsive to a data readout command issued by said host apparatus, for gaining parallel access to the divided data distributionally stored in said storage devices of said first storage pool to read said divided data, reconstructing the original data, and transferring the reconstructed original data to the said host apparatus; and means for transferring data between said first and second storage pools independently of said host apparatus.

10. An external storage unit according to claim 9, wherein said data reconstruction means comprises means responsive to an abnormality in a part of divided data included in divided data stored in said first storage pool for which a read command has been issued by said host apparatus, for reading out said divided data having said abnormality and redundant data corresponding to said divided data from said first storage pool and for reconstructing normal data from said divided data having said abnormality and redundant data corresponding thereto.

11. An external storage unit according to claim 9, wherein said control means comprises means for transferring data, which is included in data stored in said first storage pool and which has not been accessed by the host apparatus for at least a predetermined time interval, from said first storage pool to said second storage pool and for storing the transferred data in said second storage pool.

12. An external storage unit according to claim 9, wherein said control means comprises means responsive to fact that data accessed by said host apparatus is previously stored in said second storage pool, for transferring said data stored in said second storage pool to said first storage pool and storing the transferred data in said first storage pool, and means for accessing said data stored in said first storage pool.

13. An external storage unit connected to a host apparatus, comprising:

a plurality of first storage devices;

a second storage device having a lower cost per bit as compared with said plurality of first storage devices, said second storage device being not directly accessed by said host apparatus; and means for controlling said plurality of first storage devices and second storage device, wherein said control means comprises:

means for managing a storage space formed by said plurality of storage devices by dividing said storage space into a first storage pool to be directly accessed by said host apparatus and a second storage pool not to be directly accessed by said host apparatus;

means for transferring data, which is included in data stored in said second storage pool and which has not been accessed by the host apparatus for at least a first predetermined time interval, from said second storage pool to said second storage device and for storing the transferred data in said second storage device; and means for transferring data between said first and second storage pools independently of said host apparatus.

14. An external storage unit according to claim 13, wherein said control means comprises means for transferring data, which is included in data stored in said first storage pool and which has not been accessed by the host apparatus for at least a second predetermined time interval shorter than said first predetermined interval, from said first storage pool to said second storage pool and for storing the transferred data in said second storage pool.

15. An external storage unit according to claim 13, wherein said control means comprises means responsive to fact that data accessed by said host apparatus is previously stored in said second storage pool, for transferring said data stored in said second storage pool to said first storage pool and storing the transferred data in said first storage pool, and means for accessing said data stored in said first storage pool.

16. An external storage unit according to claim 13, wherein said control means comprises means responsive to fact that data accessed by said host apparatus is previously stored in said second storage device, for transferring said data stored in said second storage device to said first storage pool and storing the transferred data in said first storage pool, and means for accessing said data stored in said first storage pool.

17. An external storage unit connected to a host apparatus, comprising:

a plurality of storage devices; and means for controlling said plurality of storage devices, wherein said control means comprises:

means for managing a storage space formed by said plurality of storage devices by dividing said storage space into a first storage area capable of being directly accessed by said host apparatus and a second storage area incapable of being directly accessed by said host apparatus;

means for transferring data, which is included in data stored in said first storage area and which has not been accessed by the host apparatus for at least a predetermined time interval, from said first storage area to said second storage area and for storing the transferred data in said second storage area; and means for transferring data between said first and second storage areas independently of said host apparatus.

18. An external storage unit according to claim 17, wherein said management means comprises:

a first table storing information indicating which of said first and second storage areas stores data transferred from said host apparatus, information indicating the last time when data stored in each of said first and second storage areas has been accessed by said host apparatus, and information indicating whether data stored in each of the above described first and second storage areas is being accessed by said host apparatus;

a second table indicating contents of data stored in said first storage area; and a third table indicating contents of data stored in said second storage area.

19. An external storage unit connected to a host apparatus, comprising:

a plurality of storage devices; and means for controlling said plurality of storage devices, wherein said control means comprises:

means for managing a storage space formed by said plurality of storage devices by dividing said storage space into a first storage area capable of being directly accessed by said host apparatus and a second storage area incapable of being directly accessed by said host apparatus; and means for reading data, which is included in data stored in said first storage area and which has not been accessed by the host apparatus for at least a predetermined time interval, from said first storage area, compressing the data thus read out, then transferring the compressed data to said second storage area, and storing the transferred data in said second storage area;

means responsive to fact that data accessed by said host apparatus is previously stored in said second storage area, for expanding said data stored in said second storage area, thereafter transferring said expanded data to said first storage area, and storing said data in said first storage area; and means for transferring data between said first and second storage areas independently of said host apparatus.

20. An external storage unit according to claim 19, wherein said management means comprises:

a first table storing information indicating which of said first and second storage areas stores data transferred from said host apparatus, information indicating the last time when data stored in each of said first and second storage areas has been accessed by said host apparatus, and information indicating whether data stored in each of the above described first and second storage areas is being accessed by said host apparatus;

a second table indicating contents of data stored in said first storage area; and a third table indicating contents of data stored in said second storage area.

21. An external storage unit connected to a host apparatus, comprising:

a plurality of storage devices; and means for controlling said plurality of storage devices, wherein said control means comprises:

means for managing a storage space formed by said plurality of storage devices by dividing the storage space into a first storage area to be directly accessed by said host apparatus and a second storage pool not to be directly accessed by said host apparatus, and for managing data transferred from said host apparatus by dividing said data transferred from said host apparatus into a plurality of parts;

means for producing redundant data on the basis of all of said divided data;

means for storing said divided data and said redundant data corresponding thereto distributionally in said storage devices of said first storage pool;

data reconstruction means, responsive to a data readout command issued by said host apparatus, for gaining parallel access to the divided data distributionally stored in said storage devices of said first storage pool to read said divided data, reconstructing the original data, and transferring the reconstructed original data to the said host apparatus; and means for transferring data between said first and second storage pools independently of said host apparatus.

22. An external storage unit according to claim 21, wherein said management means comprises:

a first table storing information indicating which of said first and second storage areas stores data transferred from said host apparatus, information indicating the last time when data stored in each of said first and second storage areas has been accessed by said host apparatus, and information indicating whether data stored in each of the above described first and second storage areas is being accessed by said host apparatus;

a second table indicating contents of data stored in said first storage area; and a third table indicating contents of data stored in said second storage area.

* * * * *